(12) United States Patent
Transou, Jr.

(10) Patent No.: US 8,788,173 B2
(45) Date of Patent: Jul. 22, 2014

(54) FUEL SAVER SPEED CONTROL

(75) Inventor: Robert Horton Transou, Jr., Naples, FL (US)

(73) Assignee: Robert Horton Transou, Jr., Naples, FL (US)

( * ) Notice: Subject to any disclaimer, the term of this patent is extended or adjusted under 35 U.S.C. 154(b) by 1437 days.

(21) Appl. No.: 12/484,802

(22) Filed: Jun. 15, 2009

(65) Prior Publication Data

US 2010/0004848 A1    Jan. 7, 2010

Related U.S. Application Data

(60) Provisional application No. 61/078,605, filed on Jul. 7, 2008.

(51) Int. Cl.
*B60T 8/32*    (2006.01)

(52) U.S. Cl.
USPC .............................. 701/93; 701/110; 123/319

(58) Field of Classification Search
USPC ............................... 701/110, 93, 96; 123/319
See application file for complete search history.

(56) References Cited

U.S. PATENT DOCUMENTS

| | | | |
|---|---|---|---|
| 5,524,724 A * | 6/1996 | Nishigaki et al. | 180/176 |
| 6,397,820 B1 * | 6/2002 | Novak et al. | 123/480 |
| 7,594,496 B2 * | 9/2009 | Frenz et al. | 123/406.23 |
| 8,095,280 B2 * | 1/2012 | Price | 701/50 |
| 8,370,006 B2 * | 2/2013 | Kumar et al. | 701/19 |

* cited by examiner

*Primary Examiner* — John Kwon
(74) *Attorney, Agent, or Firm* — Leydig, Voit & Mayer, Ltd.

(57) ABSTRACT

Embodiments of the invention are used to provide a Fuel Saver Speed Control (FSSC) system that facilitates vehicle speed control while maximizing fuel economy. For instance, when the vehicle traverses an uphill section of the road, the Fuel Saver Speed Control reduces the vehicle's fuel consumption by controllably reducing engine power output within the boundaries of activated FSSC settings.

20 Claims, 5 Drawing Sheets

FUEL SAVER SPEED CONTROL

CROSS-REFERENCE TO RELATED APPLICATIONS

This patent application claims the benefit of U.S. Provisional Patent Application No. 61/078,605, filed Jul. 7, 2008, which is incorporated herein by reference in its entirety, including without limitation all figures and drawings therein.

FIELD OF THE INVENTION

This invention relates generally to the field of automotive systems and more specifically to the field of vehicle speed control.

BACKGROUND OF THE INVENTION

In the age of carbon emission limitations and unstable fuel prices, identifying ways to reduce a vehicle's power consumption and overall environmental impact are important. One such problem is an undesired increase in fuel consumption associated with vehicle's cruise or speed control operation when the vehicle is traversing an uphill portion of a roadway. Conventional speed control systems are characterized by an inflexible speed control functionality that closely tracks a driver-selected cruising speed setting, which results in an unnecessary waste of fuel when an engine needs to compensate for the uphill terrain variations.

BRIEF SUMMARY OF THE INVENTION

Embodiments of the invention are used to provide a Fuel Saver Speed Control (FSSC) system that facilitates vehicle speed control while maximizing fuel economy. For instance, when the vehicle traverses an uphill section of the road, the Fuel Saver Speed Control reduces the vehicle's fuel consumption by controllably reducing engine power output within the boundaries of activated FSSC settings.

In one aspect of the invention, a system is provided for reducing vehicle fuel consumption in connection with vehicle speed control, the system comprising: (a) an engine producing a power output necessary for a vehicle to achieve a speed control setting selected by a vehicle operator, and (b) a speed controller receiving data indicative of the power output associated with the engine, the speed controller further receiving input of a speed variation threshold and a vehicle's current speed reading in order to communicate a control directive that causes a reduction in the engine power output to a level that reduces the vehicle's current speed reading within the speed variation threshold.

In another aspect of the invention, a method is provided for reducing vehicle fuel consumption in connection with vehicle speed control, the method comprising: (a) communicating data indicative of a power output of an engine necessary for a vehicle to achieve a speed control setting selected by a vehicle operator, (b) receiving the data indicative of the power output, (c) receiving input of a speed variation threshold and a vehicle's current speed reading, and (d) issuing a control directive to reduce the engine power output to a level that reduces the vehicle's current speed reading within the speed variation threshold.

In yet another aspect of the invention, a system is provided for reducing vehicle fuel consumption in connection with vehicle speed control, the system comprising: (a) an engine controller for communicating data indicative of a power output of an engine necessary for a vehicle to achieve a speed control setting selected by a vehicle operator, and (b) a speed controller coupled to the engine controller and receiving the data indicative of the power output, the speed controller further receiving input of a speed variation threshold and a vehicle's current speed reading in order to issue a control directive to the engine controller to reduce the engine power output to a level that reduces the vehicle's current speed reading within the speed variation threshold.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The following examples further illustrate the invention but, of course, should not be construed as in any way limiting its scope.

Figure 1:
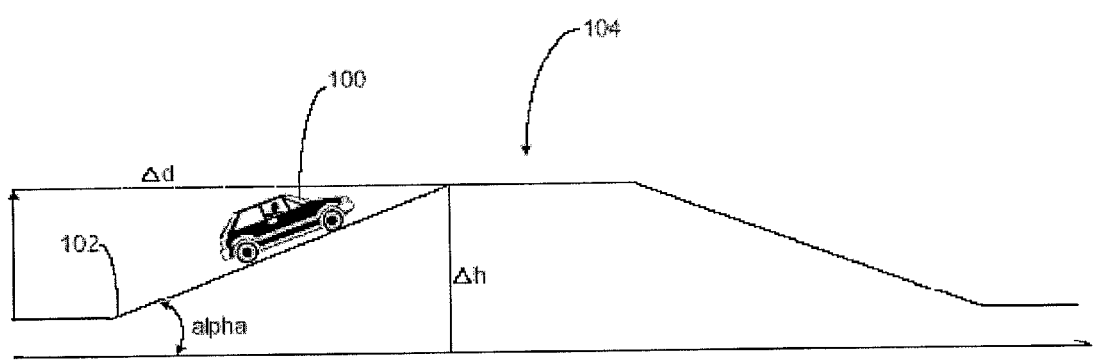
FIG. 1 is a schematic diagram of a vehicle speed control environment with reference to a vehicle capable of implementing Fuel Saver Speed Control (FSSC), in accordance with an embodiment of the invention.

Turning to FIG. 1, an embodiment of a vehicle speed control environment is shown with reference to a vehicle capable of implementing Fuel Saver Speed Control (FSSC). To facilitate vehicle operation during long commutes while maximizing fuel economy, the operator of the vehicle 100 adjusts the vehicle speed via an accelerator pedal and activates the Fuel Saver Speed Control to maintain vehicle speed within one or more predetermined thresholds of the desired speed setting under a plurality of road conditions. For instance, when the vehicle 100 traverses an uphill section 102 of the road 104, the Fuel Saver Speed Control reduces the vehicle's fuel consumption by controllably reducing engine power output within the boundaries of activated FSSC settings. In embodiments, the vehicle 100 is a car, a truck, a bus, an SUV, or any automotive vehicle capable of traveling on a road surface where speed control may be desired. In one embodiment, the Fuel Saver Speed Control system described herein is coupled to an internal combustion engine. In additional embodiments, the Fuel Saver Speed Control System is coupled to an electric engine or a hybrid engine of the vehicle 100.

Figure 2:
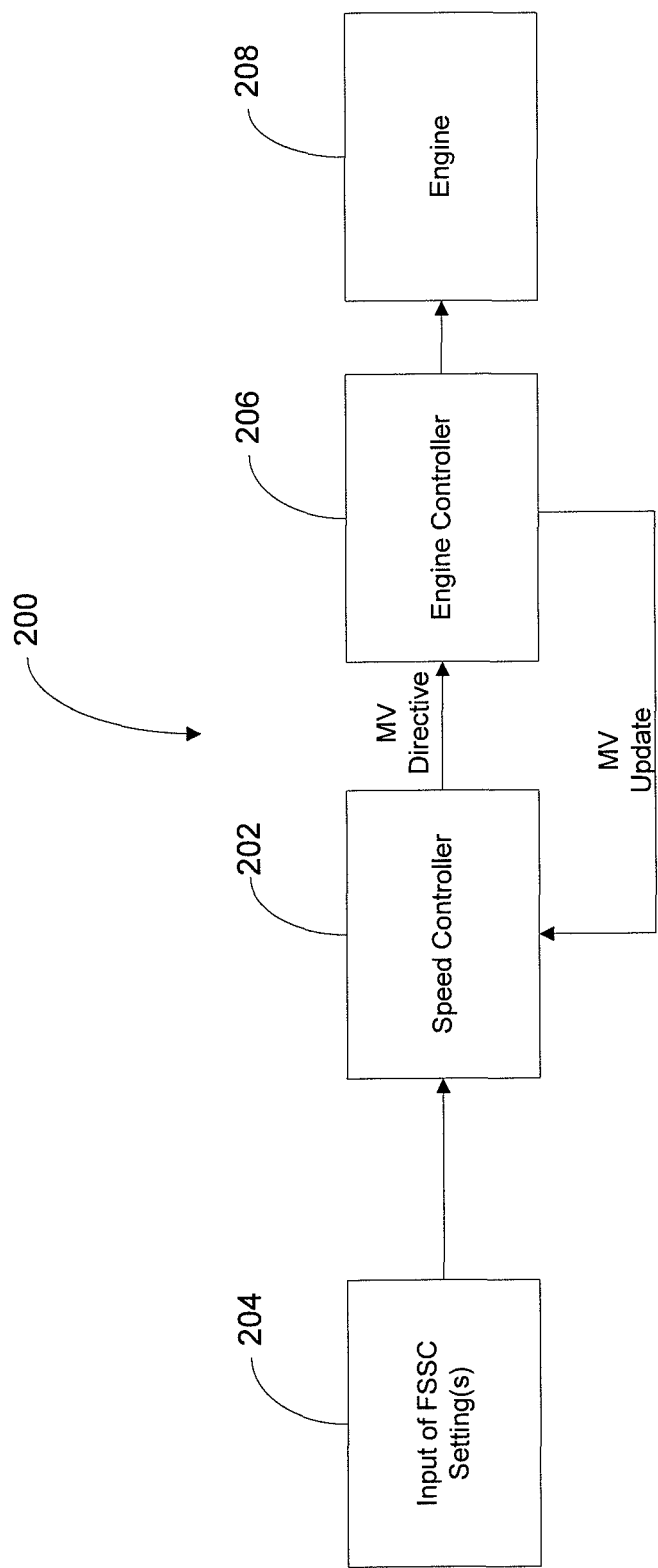
FIGS. 2-4 are schematic diagrams of the Fuel Saver Speed Control system of FIG. 1, in accordance with various embodiments of the invention.

Turning to FIG. 2, an embodiment of a Fuel Saver Speed Control system 200 is shown. The speed controller module 202 accepts an input of FSSC threshold settings 204, indicating the permitted amount of speed variance from the desired speed, and, when appropriate, instructs the engine controller 206 to lower the output of the engine 208 within the corresponding FSSC speed thresholds. In one embodiment, the FSSC thresholds comprise a predetermined speed threshold variance, such as 5 mph, from the desired cruising speed selected by the vehicle operator. The FSSC thresholds described above may be pre-programmed into the firmware of the speed controller 202 or received via the driver's interaction with the vehicle controls. For instance, the driver selects a particular FSSC threshold via a steering wheel control, such as a button or another selection device, wherein the button corresponds to a specific speed tolerance value or interacts with a user interface, such as a screen prompt, for custom selection of the FSSC value within a predetermined speed tolerance range (e.g., within 2-10 mph from the desired cruise control setting). Preferably, the speed controller 202 monitors the intake manifold vacuum (MV) pressure (in inches of mercury, Hg) that corresponds to a particular engine power output necessary for the vehicle 100 to achieve the speed setting selected by the vehicle operator. For example, when the vehicle operator selects 70 mph as the speed to be maintained by the vehicle, the engine 208 may need to create 10 inches of mercury of vacuum in the intake manifold in order to maintain such speed. As the vehicle traverses over an uphill section 102 of the road 104, more power is required to maintain the desired 70 mph speed, which results in a lower MV reading (e.g., 5 in Hg). The increased engine output requirement, in turn, reduces the vehicle's fuel economy. Therefore, to reduce the vehicle's fuel consumption in situations where higher engine output (i.e., lower MV level) is required to maintain the desired speed, the speed controller 202 receives periodic updates of current MV readings from the engine controller 206 and issues commands to vary the engine's MV levels to reduce the engine output within the limits of the FSSC speed variance. Once the vehicle 100 is traveling at the lower boundary of the FSSC speed variance (e.g., at 65 mph given a 5 mph FSSC setting and 70 mph desired cruising speed), the speed controller 202 maintains the vehicle speed at this "FSSC set" level until the vehicle crests the hill. The speed controller 202 then directs the engine controller 206 to slowly increase the MV level, for example to 8 in Hg, while holding the vehicle's throttle steady as the vehicle increases speed to the originally set 70 mph now corresponding to a 10 in Hg MV level, for example. When increased engine output is no longer necessary to compensate for the uneven grade of terrain, the system resumes speed control at the originally set level (i.e., without applying the FSSC thresholds).

In an alternative embodiment, the speed controller 202 issues directives to the engine controller 206 to reduce the engine output to the FSSC threshold when the vehicle is traversing an uphill grade, by monitoring a plurality of engine parameters, such as engine throttle angle, fuel flow measurement, air mass flow measurement, and/or diesel fuel rack setting.

Figure 3:
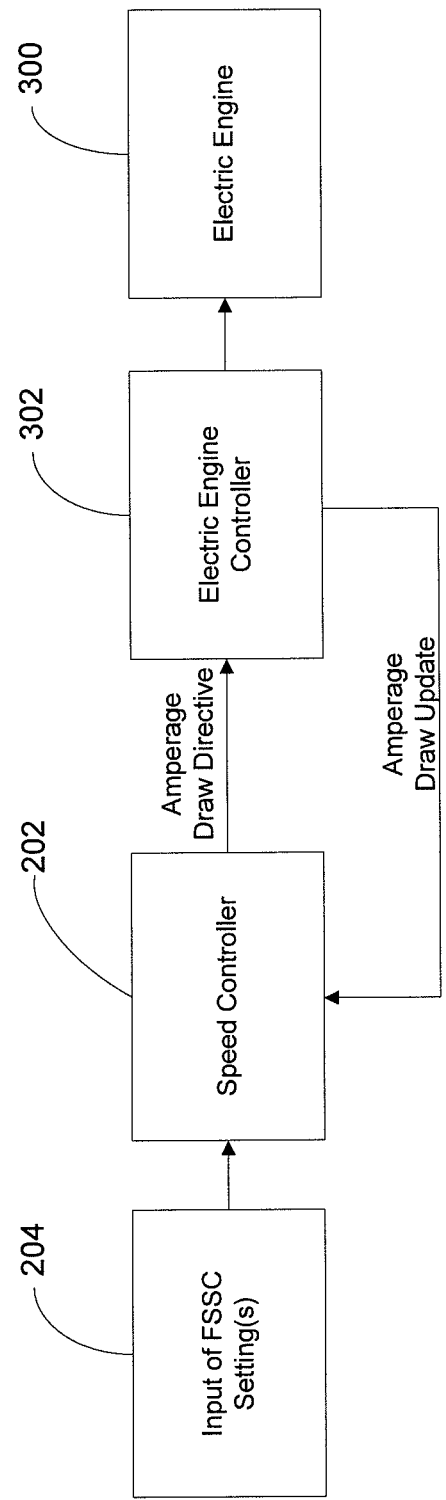

While the foregoing description focused on controlling speed of a vehicle having an internal combustion engine, including a supercharged or a turbocharged engine and whether consuming gasoline, ethanol, propane, CNG, diesel, hydrocarbon, or another type of fuel, those skilled in the art will realize that the FSSC system is equally applicable to controlling speeds of vehicles equipped with hybrid, purely electric, as well as other propulsion systems. Those skilled in the art will further realize that various speed and engine controllers described herein may be implemented via hardware and/or firmware and may comprise separate units or be part of one or more other controller units, such as part of another electronic control unit, an engine control unit, or the like. As illustrated in FIG. 3, for instance, to control the output of an electric engine 300 to achieve the reduced engine output and increased fuel economy when the vehicle traverses an uphill section of the road, the FSSC system relies on monitoring and controlling the amperage (current) draw of an electric engine 300 within the bounds of the FSSC speed thresholds described above. To this end, the speed controller 202 interfaces with the electric engine controller 302 coupled to the electric engine 300.

Figure 4:
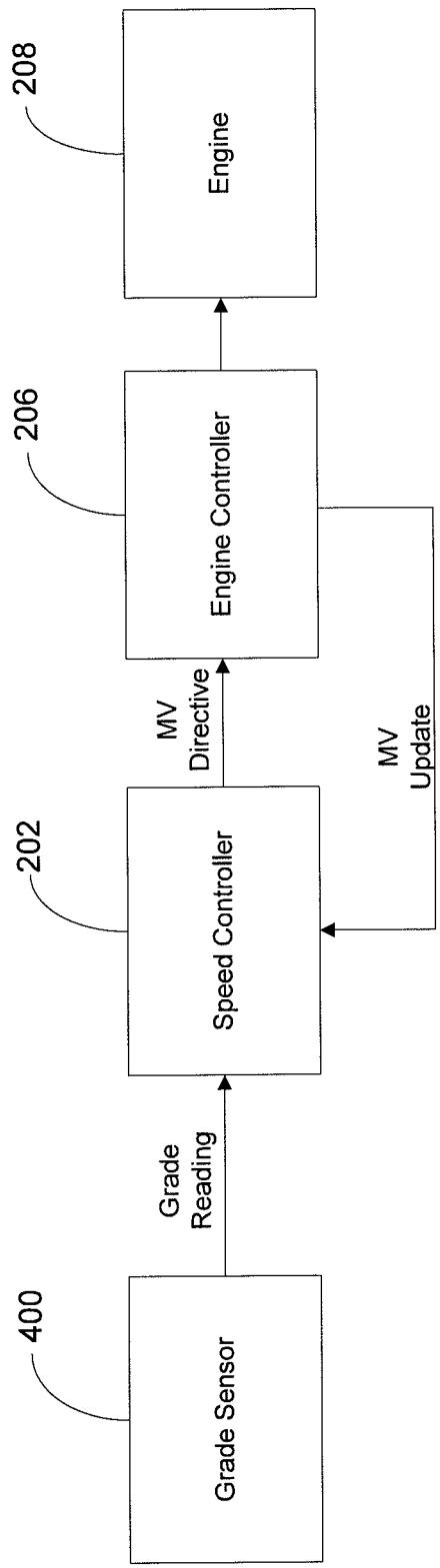

In yet another embodiment, illustrated in FIG. 4, the speed controller 202 interfaces with a grade sensor 400 for receiving readings of current grade level of the uphill road section 102 (FIG. 1). Referring again, for the moment, to FIG. 1, the grade is calculated as the following percentage: grade=rise($\Delta$h)/run ($\Delta$d)*100. Alternatively, grade=tan(alpha)*100. Therefore, the speed controller 202 varies the FSSC threshold in accordance with the current grade estimate received from the grade sensor 400, such as by decreasing the engine power output corresponding to one or more predetermined roadway grade levels. For example, for a 1% grade level, the speed controller 202 decreases the vehicle speed under FSSC operation by 5 mph, for 3% by 10 mph, and for 4% by 15 mph up to a predetermined maximum depending on the vehicle's maximum grade capability (at which time the speed control would turn off).

Figure 5:
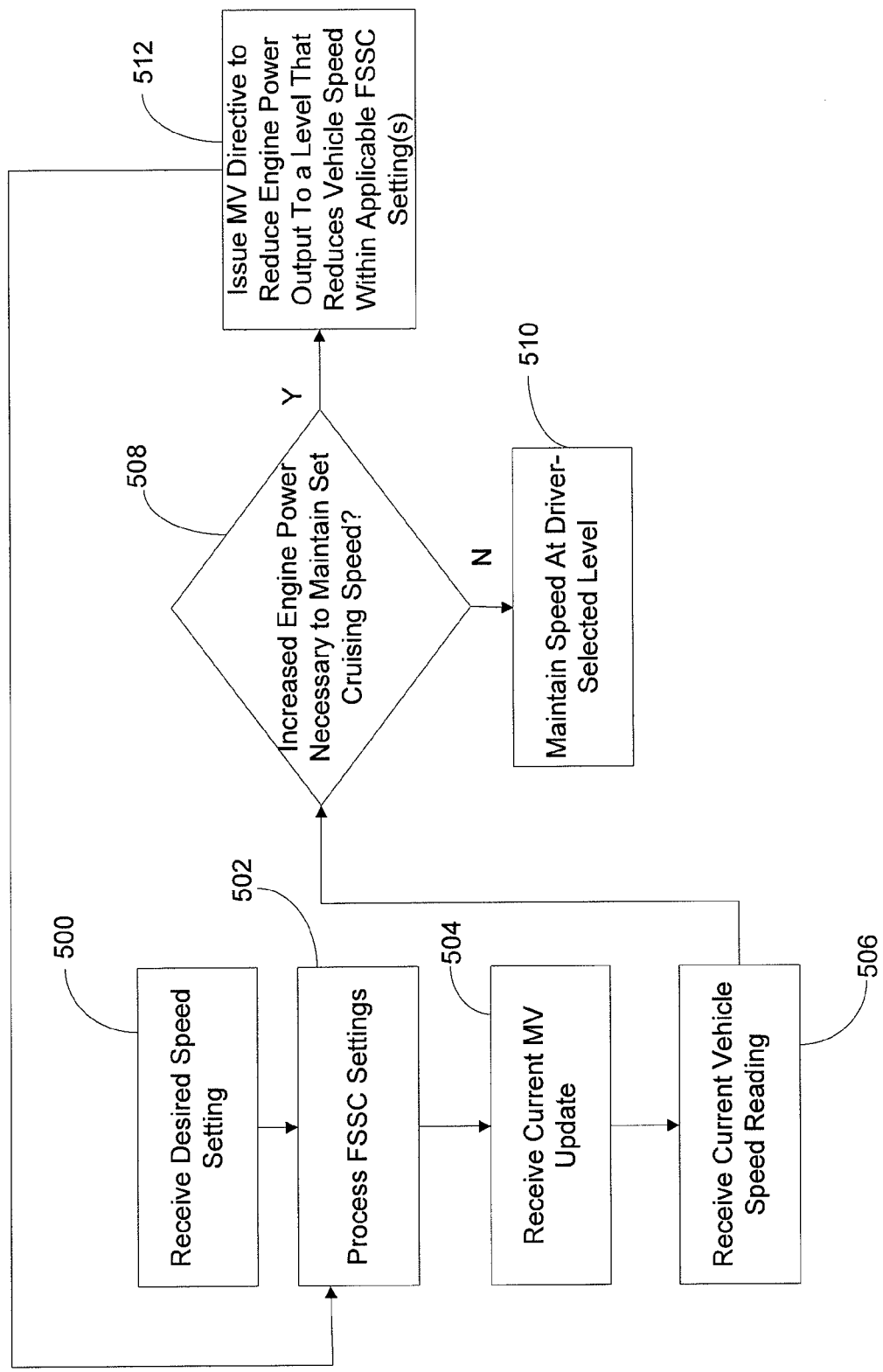
FIG. 5 is a flow chart of a method for reducing vehicle fuel consumption in connection with a speed control operation of the system of FIGS. 1-4, in accordance with an embodiment of the invention.

Turning to FIG. 5, an embodiment of a method for reducing vehicle fuel consumption in connection with a speed control operation is shown. In steps 500-502, the speed controller receives a desired vehicle cruising speed setting and processes the associated FSSC settings to ascertain the permissible reduction in speed and engine power output levels when the vehicle requires an increase in power output to maintain the desired speed. As described in various embodiments above, the speed controller FSSC ascertains the FSSC speed reduction levels via one or more of the following methods: reading pre-programmed FSSC speed variance settings from its memory, receiving driver selection from the vehicle's controls, or via a variable grade sensor input. In steps 504-506, the speed controller 202 receives updates of current manifold vacuum (MV) and current vehicle speed readings. If the vehicle does not require an increase in engine power output to maintain the set cruising speed, the speed controller 202 maintains engine power output (via MV level control, for example) so as to maintain vehicle speed at the driver-selected level, steps 508-510. If, however, an increase in engine power output is required in order to maintain driver-selected speed (e.g., due to traversing an uphill portion of the road), the speed controller 202 issues MV level directives to the engine controller 206 in order to decrease the engine power output within the boundaries of any corresponding FSSC settings described above, step 512.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for reducing vehicle fuel consumption in connection with vehicle speed control, the system comprising:
    an engine producing a power output necessary for a vehicle to achieve a speed control setting selected by a vehicle operator; and
    a speed controller receiving data indicative of the power output associated with the engine, the speed controller further receiving input of a speed variation threshold and a vehicle's current speed reading, the speed controller being selectively activatable by the vehicle operator to cause a reduction in engine power output;
    wherein the speed controller is arranged and configured to cause engine power output to reduce by:
        monitoring said data indicative of the power output associated with the engine,
        determining whether the power output necessary for a vehicle to maintain the speed control setting selected by the operator exceeds a maximum desired power output, and
        when the speed controller is active and the power output of the engine exceeds the maximum desired power, communicating a control directive that causes a reduction in the engine power output to a level that reduces the vehicle's current speed reading within the speed variation threshold.

2. The system of claim 1 wherein the speed controller communicates the control directive when an increase in the engine power output is necessary to maintain the speed control setting selected by the vehicle operator.

3. The system of claim 1 further comprising an engine controller coupled to the engine for communicating the data indicative of the engine power output to the speed controller and receiving the control directive.

4. The system of claim 1 wherein the speed variation threshold comprises a speed threshold by which the speed control setting selected by the vehicle operator is reduced.

5. The system of claim 1 wherein the data indicative of the power output associated with the engine comprises one or more of an engine throttle angle, a fuel flow measurement, an air mass flow measurement, and a diesel fuel rack setting.

6. The system of claim 1 wherein the data indicative of the power output associated with the engine comprises a manifold vacuum pressure and the control directive varies the manifold vacuum pressure to reduce the engine power output.

7. The system of claim 1 wherein the engine is an electric engine and the data indicative of the power output associated with the engine comprises an engine current draw.

8. The system of claim 1 wherein the engine is selected from the group consisting of: an internal combustion engine, a hybrid engine, and an electric engine.

9. The system of claim 1 further comprising a grade sensor coupled to the speed controller for decreasing the engine power output in accordance with one or more predetermined roadway grade levels.

10. The system of claim 1 wherein the speed controller communicates the control directive when the vehicle is traversing an uphill section of a roadway.

11. A method for reducing vehicle fuel consumption in connection with vehicle speed control, the method comprising:
    communicating data indicative of a power output of an engine necessary for a vehicle to achieve a speed control setting selected by a vehicle operator to a speed controller;
    selectively activating the speed controller by a vehicle operator;
    receiving, with the speed controller, the data indicative of the power output of the engine, and monitoring said data with the speed controller to determine whether the power output necessary for a vehicle to maintain the speed control setting selected by the operator exceeds a maximum desired power output;
    receiving input of a speed variation threshold and a vehicle's current speed reading to the speed controller; and,
    when the power output of the engine that is necessary for the vehicle to maintain the speed control setting selected by the operator exceeds the maximum desired power output, and when the speed controller is active, issuing a control directive from the speed controller to reduce the engine power output to a level that reduces the vehicle's current speed reading within the speed variation threshold.

12. The method of claim 11 further comprising issuing the control directive when an increase in the engine power output is necessary to maintain the speed control setting selected by the vehicle operator.

13. The method of claim 11 wherein the speed variation threshold comprises a speed threshold by which the speed control setting selected by the vehicle operator is reduced.

14. The method of claim 11 wherein the data indicative of the power output of the engine comprises one or more of an engine throttle angle, a fuel flow measurement, an air mass flow measurement, and a diesel fuel rack setting.

15. The method of claim 11 wherein the data indicative of the power output of the engine comprises a manifold vacuum pressure, the method further comprising varying the manifold vacuum pressure to reduce the engine power output.

16. The method of claim 11 wherein the engine is an electric engine and the data indicative of the power output associated with the engine comprises an engine current draw.

17. The method of claim 11 wherein the engine is selected from the group consisting of: an internal combustion engine, a hybrid engine, and an electric engine.

18. The method of claim 11 further comprising decreasing the engine power output in accordance with one or more predetermined roadway grade levels.

19. The method of claim 11 further comprising issuing the control directive when the vehicle is traversing an uphill section of a roadway.

20. A system for reducing vehicle fuel consumption in connection with vehicle speed control, the system comprising:

an engine controller for communicating data indicative of a power output of an engine necessary for a vehicle to achieve a speed control setting selected by a vehicle operator; and a speed controller coupled to the engine controller and receiving the data indicative of the power output, the speed controller further receiving input of a speed variation threshold and a vehicle's current speed reading, the speed controller being selectively activatable by the vehicle operator to cause a reduction in engine power output;

wherein the speed controller is arranged and configured to cause engine power output to reduce by:
   monitoring said data indicative of the power output associated with the engine,
   determining whether the power output necessary for a vehicle to maintain the speed control setting selected by the operator exceeds a maximum desired power output, and when the speed controller is active and the power output of the engine exceeds the maximum desired power, issuing a control directive to the engine controller to reduce the engine power output to a level that reduces the vehicle's current speed reading within the speed variation threshold.

* * * * *